(12) United States Patent
Wakaki et al.

(10) Patent No.: US 9,025,950 B2
(45) Date of Patent: May 5, 2015

(54) COMMUNICATION SYSTEM AND OPTICAL TRANSMISSION DEVICE

(71) Applicant: Hitachi Metals, Ltd., Tokyo (JP)

(72) Inventors: Yuichi Wakaki, Tsuchiura (JP); Hitoshi Ogihara, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 40 days.

(21) Appl. No.: 13/959,582

(22) Filed: Aug. 5, 2013

(65) Prior Publication Data
US 2014/0072295 A1 Mar. 13, 2014

(30) Foreign Application Priority Data
Sep. 11, 2012 (JP) ................................. 2012-199838

(51) Int. Cl.
*H04B 10/00* (2013.01)
*H04B 10/038* (2013.01)
*H04B 10/80* (2013.01)
*H04J 14/00* (2006.01)

(52) U.S. Cl.
CPC ............ *H04B 10/038* (2013.01); *H04B 10/801* (2013.01)

(58) Field of Classification Search
CPC ... H04B 10/032; H04B 10/038; H04J 14/029; H04J 14/0294
USPC .......................................................... 398/1–8
See application file for complete search history.

(56) References Cited

U.S. PATENT DOCUMENTS

| 7,701,847 B2* | 4/2010 | Chen et al. ..................... 370/217 |
| 7,991,286 B2* | 8/2011 | Maeda et al. ....................... 398/4 |
| 2010/0322618 A1* | 12/2010 | Zheng ............................... 398/2 |

* cited by examiner

Primary Examiner — Daniel Dobson
(74) Attorney, Agent, or Firm — McGinn IP Law Group, PLLC

(57) ABSTRACT

In a normal operation, line cards LCm1 and LCm2 set transmit ports TXu of user ports UPm1 and UPm2 into an open state, and line cards LCs1 and LCs2 set transmit ports TXu of user ports UPs1 and UPs2 into a blocking state. Here, for example, if a failure occurs in a communication line LNa1, the line card LCm2 detects the failure through a transmission port HPm2, and then changes the transmit port TXu in the user port UPm2 from the open state to the blocking state, and notifies the line card LCs2 of failure detection through a backplane. The line card LCs2 receives the notification of the failure detection, and changes the transmit port TXu in the user port UPs2 from the blocking state to the open state.

5 Claims, 8 Drawing Sheets

HP: TRANSMISSION PORT   TX: TRANSMIT PORT
LC: LINE CARD           UP: USER PORT
LN: COMMUNICATION LINE

COMMUNICATION SYSTEM AND OPTICAL TRANSMISSION DEVICE

The present application is based on Japanese patent application No. 2012-199838 filed on Sep. 11, 2012, the entire contents of which are incorporated herein by reference.

BACKGROUND OF THE INVENTION

1. Field of the Invention

The present invention relates to a communication system and an optical transmission device, and particularly to an effective technique applied to a communication system to realize redundancy in communication between optical transmission devices and an optical transmission device thereof.

2. Description of the Related Art

For example, U.S. Pat. No. 7,701,847 B2 discloses a system including a transmitting part that divides a transmission signal into two signals by a coupler and transmits the respective transmission signals through two cards, and a receiving part that receives the respective transmission signals through two cards and combines the received signals by a coupler. In the receiving part, the qualities of the received signals are compared between the two cards, and one of the cards which is more excellent in quality is selected.

For example, in a communication network of a company, there is a case where a large amount of data are transmitted and received between, for example, bases separated from each other by several tens km or more in the company. Especially, in such a communication network, it is required that a communication band is expanded and the distance of communication is extended. In order to satisfy such a request, for example, a technique is known in which a device called an optical transmission device is placed in each of the bases in the company, and the respective optical transmission devices are connected to each other by long-distance optical fiber cables.

In such a communication network, since the number of optical fiber cables to connect the optical transmission devices is limited in view of the cost, in the optical transmission device, a technique to expand the communication band of each optical fiber cable is developed. On the other hand, when the long-distance optical fiber cable is used, a possibility that a failure occurs in the cable becomes high. As a result, when such a failure occurs, the damage becomes large.

SUMMARY OF THE INVENTION

The invention is made in view of such circumstances, and has an object to provide a communication system and an optical transmission device in which failure resistance can be improved. The above and other objects and novel features of the invention would become clear from the description of the specification and attached drawings.

The outline of a typical embodiment of the invention disclosed in this application is as described below.

According to an embodiment, a communication system includes a first to a fourth line card, a first to a fourth communication line, a first and a second switch device, a first to a fourth coupler, and a first and a second backplane.

Each of the first to the fourth line card includes a user port and a transmission port.

The first communication line transmits a transmission signal from the first line card to the third line card, and the third communication line transmits a transmission signal in a reverse direction to that of the first communication line. The second communication line transmits a transmission signal from the second line card to the fourth line card, and the fourth communication line transmits a transmission signal in a reverse direction to that of the second communication line.

The first coupler divides a transmission signal from the first switch device into two signals, and transmits the signals to the user ports of the first and the second line card respectively. Third coupler divides a transmission signal from the second switch device into two signals, and transmits the signals to the user ports of the third and the fourth line card respectively. The second coupler combines transmission signals from the user ports of the first and the second line cards and transmits to the first switch device. The fourth coupler combines transmission signals from the user ports of the third and the fourth line card and transmits to the second switch device.

The first backplane is installed with the first and the second line card, and has a communication path between the first and the second line card. The second backplane is installed with the third and the fourth line card, and has a communication path between the third and the fourth line card.

Here, in a normal operation, the first and the third line card set transmit ports in the user ports into an open state, and the second and the fourth line card set transmit ports in the user ports into a blocking state.

On the other hand, if a failure occurs in the communication path through the first communication line from the first line card, the third line card detects the failure through a receive port in the transmission port, and then changes the transmit port in the user port from the open state to a blocking state, and notifies the fourth line card of failure existence information obtained from the failure detection through the second backplane. The fourth line card receives the failure existence information and changes the transmit port in the user port from the blocking state to the open state.

When briefly described, an effect obtained by the typical embodiment of the invention disclosed in this application is that failure resistance can be improved.

DETAILED DESCRIPTION OF THE PREFERRED EMBODIMENTS

In the following embodiments, when necessary for convenience, the description is divided into plural sections or embodiments. However, except for a clearly specified case, those are not irrelevant to each other, and one of them is a modified example, a detailed explanation, a supplemental explanation or the like of a part or all of the other. Besides, in the following embodiments, when the number or the like (including number, numerical value, quantity, range, etc.) of components is mentioned, except for a clearly specified case and a case where a limitation is obviously made to a specific number in principle, no limitation is made to the specific number, and a number larger or smaller than the specific number may be adopted.

Further, in the following embodiments, it is needless to say that a component (including a component step etc.) is not necessarily inevitable except for a clearly specified case and a case where the component is obviously inevitable in principle. Similarly, in the following embodiments, when a shape of a component, a positional relation and the like are mentioned, except for a clearly specified case and a case which is obviously unreasonable in principle, what is substantially close to or similar to the shape or the like is included. The same applies to the numerical value and the range.

Hereinafter, embodiments of the invention will be described in detail with reference to the drawings. Incidentally, the same members are denoted by the same reference signs in all the drawings for describing the embodiments, and the repetitive explanation thereof is omitted.

Schematic Structure of Communication System

Figure 1:
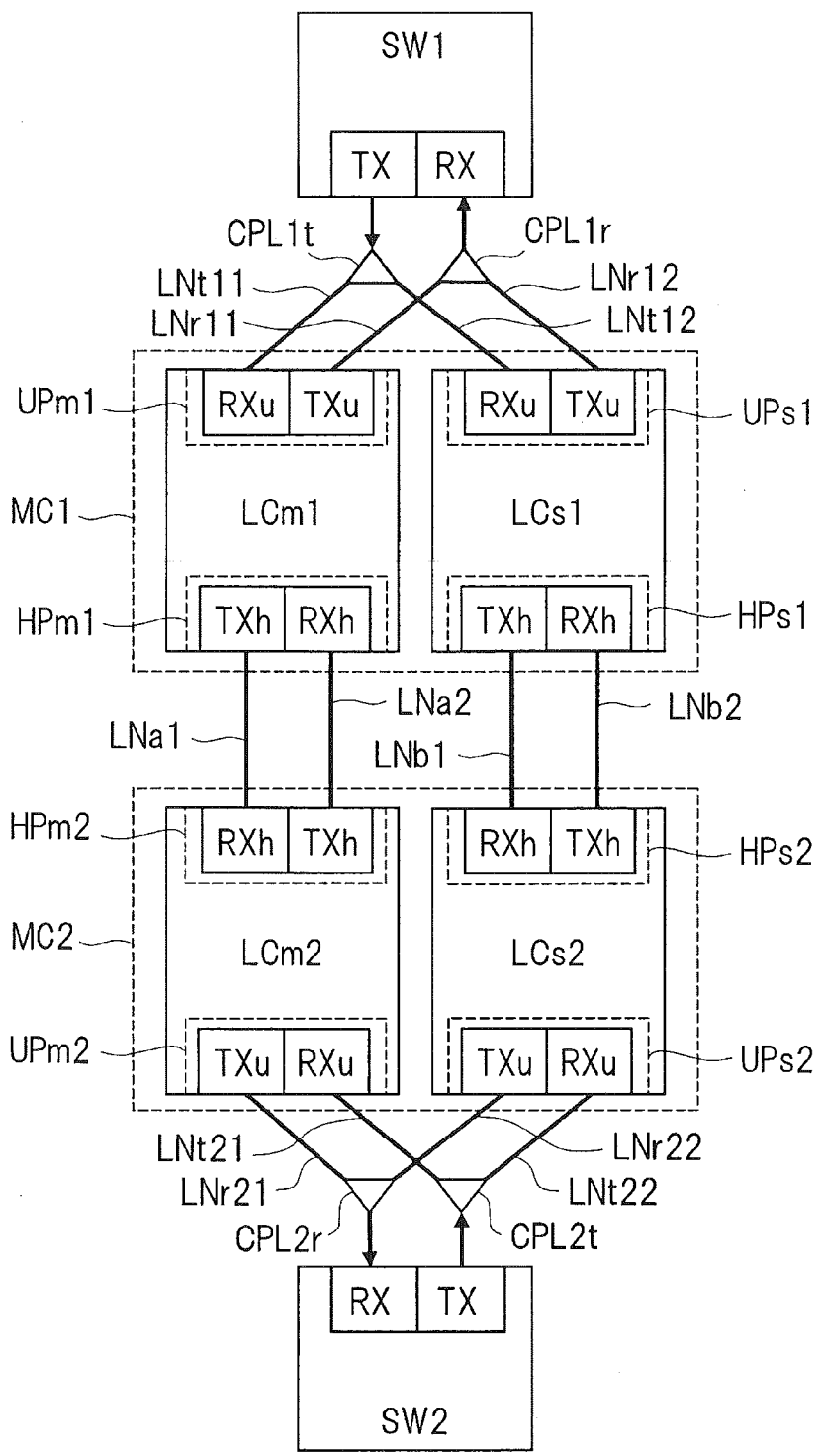
FIG. 1 is a schematic view showing an example of a structure of a communication system according to an embodiment of the invention.

FIG. 1 is a schematic view showing an example of a structure of a communication system according to an embodiment of the invention. The communication system shown in FIG. 1 includes switch devices (a first and a second switch device) SW1 and SW2, optical transmission devices MC1 and MC2, couplers CPL1$t$, CPL1$r$, CPL2$t$ and CPL2$r$, and plural communication lines LN. The optical transmission device MC1 includes line cards (a first and a second line card) LCm1 and LCs1, and the optical transmission device MC2 includes line cards (a third and a fourth line card) LCm2 and LCs2. The line card LCm1 includes a user port UPm1 and a transmission port HPm1. The line card LCs1 also includes a user port UPs1 and transmission port HPs1. Similarly, the line cards LCm2 and LCs2 include user ports UPm2 and UPs2 and transmission ports HPm2 and HPs2, respectively. Each of the user ports UP includes a transmit port TXu and a receive port RXu, and each of the transmission ports HP includes a transmit port TXh and a receive port RXh.

The transmission port HPm1 of the line card LCm1 is connected to the transmission port HPm2 of the line card LCm2 through communication lines (a first and a third communication line) LNa1 and Lna2 formed of, for example, optical fiber cables. Specifically, the transmit port TXh in the transmission port HPm1 and the receive port RXh in the transmission port HPm2 are connected through the communication line LNa1, and the receive port RXh in the transmission port HPm1 and the transmit port TXh in the transmission port HPm2 are connected through the communication line LNa2. Similarly, the transmission port HPs1 of the line card LCs1 is connected to the transmission port HPs2 of the line card LCs2 through communication lines (a second and a fourth communication line) LNb1 and LNb2 formed of, for example, optical fiber cables.

Each of the switch devices SW1 and SW2 is, for example, a LAN switch (L2 switch) to which plural not-shown terminals and the like are suitably connected, and includes a transmit port TX and a receive port RX for the optical transmission device. A transmission signal from the one transmit port TX of the switch device SW1 is divided into two signals through the coupler (first coupler) CPL1$t$ which is, for example, an optical coupler. The two divided transmission signals are respectively inputted to the user ports UPm1 and UPs1 of the line cards LCm1 and LCs1 through communication lines (for example, optical fiber cables) LNt11 and LNt12. Specifically, one of the transmission signals from the coupler CPL1$t$ is inputted to the receive port RXu in the user port UPm1 through the communication line LNt11, and the other of the transmission signals is inputted to the receive port RXu in the user port UPs1 through the communication line LNt12.

On the other hand, individual transmission signals from the user ports UPm1 and UPs1 of the line cards LCm1 and LCs1 are respectively inputted to the coupler (second coupler) CPL1$r$ which is, for example, an optical coupler through communication lines (for example, optical fiber cables) LNr11 and LNr12. Specifically, the transmission signal from the transmit port TXu in the user port UPm1 is inputted to the coupler CPL1$r$ through the communication line LNr11, and the transmission signal from the transmit port TXu in the user port UPs1 is also inputted to the coupler CPL1$r$ through the communication line LNr12. The coupler CPL1$r$ combines the inputted transmission signals, and transmits the combined signal to the one receive port RX of the switch device SW1.

Similarly, a transmission signal from the one transmit port TX of the switch device SW2 is divided into two signals through the coupler (third coupler) CPL2$t$ which is, for example, an optical coupler, and the divided signals are respectively inputted to the user ports UPm2 and UPs2 of the line cards LCm2 and LCs2 through communication lines (for example, optical fiber cables) LNt21 and LNt22. On the other hand, individual signals from the user ports UPm2 and UPs2 of the line cards LCm2 and LCs2 in the reverse direction are respectively inputted to the coupler (fourth coupler) CPL2$r$ which is, for example, an optical coupler through communication lines (for example, optical fiber cables) LNr21 and LNr22. The coupler CPL2$r$ combines the inputted transmission signals and transmits the combined signal to the one receive port RX of the switch device SW2.

Figure 2:
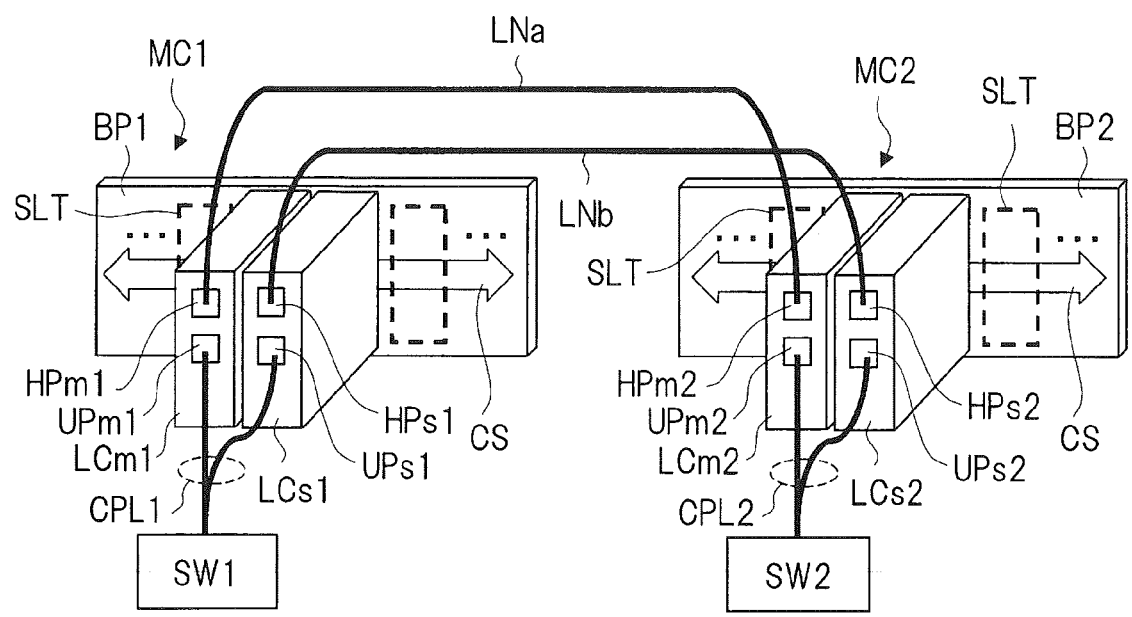
FIG. 2 is an outer appearance view showing a schematic structural example of the communication system of FIG. 1.

FIG. 2 is an outer appearance view showing a schematic structural example of the communication system of FIG. 1. As shown in FIG. 2, each of the optical transmission devices MC1 and MC2 has a so-called chassis-type structure. The chassis-type optical transmission device MC1 includes a backplane (first backplane) BP1 on which plural slots SLT are placed and which is formed of a wiring board or the like, and the line cards LCm1 and LCs1 suitably installed in the respective slots SLT, and these are housed in a not-shown same housing. The backplane BP1 has a communication path between the line cards LCm1 and LCs1, and the communication path is realized by a control signal line CS to connect the respective slots SLT on the backplane BP1. Similarly, the chassis-type optical transmission device MC2 includes a backplane (second backplane) BP2 formed of a wiring board or the like, and the line cards LCm2 and LCs2 suitably installed in the respective slots SLT, and these are housed in a same housing. The backplane BP2 has a communication path between the line cards LCm2 and LCs2, and the communication path is realized by a control signal line CS to connect the respective slots SLT on the backplane BP2.

In FIG. 2, the transmission port HPm1 of the line card LCm1 and the transmission port HPm2 of the line card LCm2 are connected through a communication line (for example, a two-core optical fiber cable) LNa including the communication lines LNa1 and LNa2 of FIG. 1. Similarly, the transmission port HPs1 of the line card LCs1 and the transmission port HPs2 of the line card LCs2 are connected through a communication line (for example, a two-core optical fiber cable) LNb including the communication lines LNb1 and LNb2 of FIG. 1. Although not particularly limited, each of the communication lines LNa and LNb has a length of, for example, several tens km or more. Besides, a coupler CPL1 of FIG. 2 actually includes the two couplers CPL1t and CPL1r as shown in FIG. 1, and similarly, a coupler CPL2 of FIG. 2 also actually includes the two couplers CPL2t and CPL2r.

In the communication system as stated above, since a long-distance communication line extending several tens km is used as described above, there is a high possibility that a failure occurs on the communication line. Then, in the communication system of this embodiment, the dual-system communication lines (communication lines LNa and LNb) are provided between the switch device SW1 and the switch device SW2 by using the couplers CPL1 and CPL2. Although the details will be described later, one of them can be used as a preliminary line when a failure occurs in the other.

Schematic Operation of the Communication System (when there is No Failure)

Figure 3:
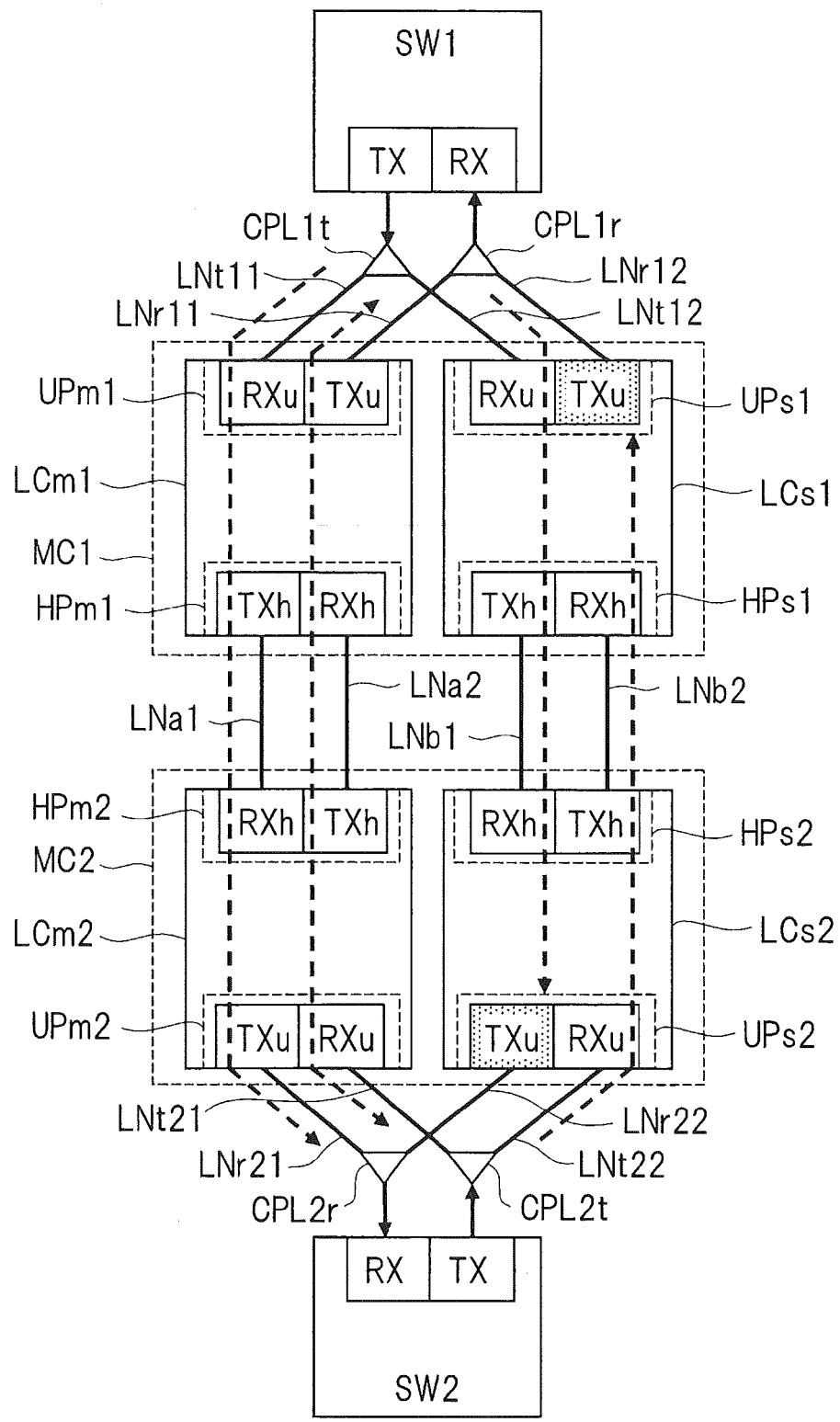
FIG. 3 is an explanatory view showing an operation example when there is no failure in the communication system of FIG. 1.

FIG. 3 is an explanatory view showing an operation example when there is no failure in the communication system of FIG. 1. As shown in FIG. 3, when there is no failure in the communication system, for example, in the one line card LCs1 in the optical transmission device MC1 and the one line card LCs2 in the optical transmission device MC2 opposite thereto, both the transmit ports TXu in the user ports UPs1 and UPs2 are set in a blocking state. As a result, communication between the switch device SW1 and the switch device SW2 is effectively performed through the other line card LCm1 in the optical transmission device MC1 and the other line card LCm2 in the optical transmission device MC2 opposite thereto.

That is, a transmission signal from the transmit port TX of the switch device SW1 is divided into two signals through the coupler CPL1t, and the signals are transmitted from both the line cards LCm1 and LCs1 to both the line cards LCm2 and LCs2. However, although the transmit port TXu of the line card LCm2 is in an open state, the transmit port TXu of the line card LCs2 is in a blocking state. In the open state (or an effective state), passage of signals (frames, packets, etc.) is allowed, and in the blocking state (or an ineffective state), passage of signals is blocked. Thus, an input is made to the coupler CPL2r from only the transmit port TXu side of the line card LCm2, and as a result, the transmission signal can be normally transmitted to the receive port RX of the switch device SW2. Similarly, a transmission signal from the transmit port TX of the switch device SW2 is divided into two signals through the coupler CPL2t, and the signals are transmitted from both the line cards LCm2 and LCs2 to both the line cards LCm1 and LCs1. However, although the transmit port TXu of the line card LCm1 is in the open state, the transmit port TXu of the line card LCs1 is in the blocking state. Thus, an input is made to the coupler CPL1r from only the transmit port TXu side of the line card LCm1, and as a result, the transmission signal can be normally transmitted to the receive port RX of the switch device SW1.

Schematic Operation of the Communication System (when a Failure Occurs)

Figure 4:
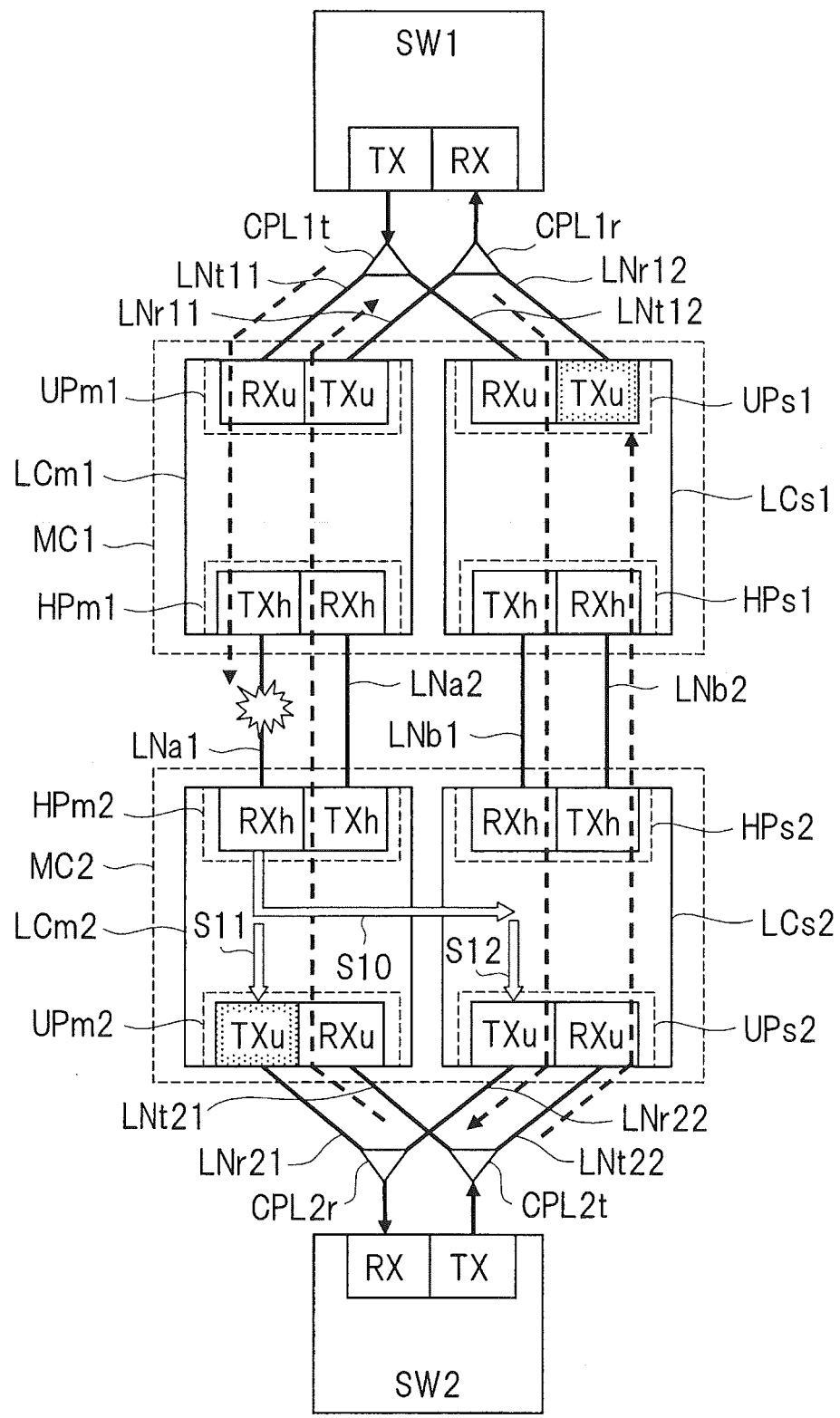
FIG. 4 is an explanatory view showing an operation example when a failure occurs in the communication system of FIG. 1.

FIG. 4 is an explanatory view showing an operation example when a failure occurs in the communication system of FIG. 1. In FIG. 4, a case where a failure occurs in the transmission path (communication line LNa1) from the transmission port HPm1 of the line card LCm1 to the transmission port HPm2 of the line card LCm2 is used as an example, and an operation example at that time is shown. In this case, first, the line card LCm2 detects the occurrence of the failure by detecting, for example, reduction of a reception level at the receive port RXh, and notifies the line card LCs2 of failure existence information based on the failure detection through the control signal line CS on the backplane BP2 of FIG. 2 (step S10 (first process)). Besides, when detecting the failure, the line card LCm2 changes the transmit port TXu in the user port UPm2 from the open state (effective state) to the blocking state (ineffective state) (step S11 (first process)).

Next, when receiving the failure existence information at step S10, the line card LCs2 changes the transmit port TXu in the user port UPs2 from the blocking state to the open state (step S12 (second process)). As a result, a transmission signal from the transmit port TX of the switch device SW1 is transmitted to the receive port RX of the switch device SW2 by using the path of the line card LCs1, the communication line LNb1 and the line card LCs2 instead of the path of the line card LCm1, the communication line LNa1 and the line card LCm2. By this, failure resistance can be improved. Besides, at this time, since the chassis-type structure is used in the optical transmission devices MC1 and MC2, the notification of the failure existence information between the respective line cards at step S10 can be quickly performed. Accordingly, the change of the path at the failure occurrence can be performed at high speed.

Figure 5:
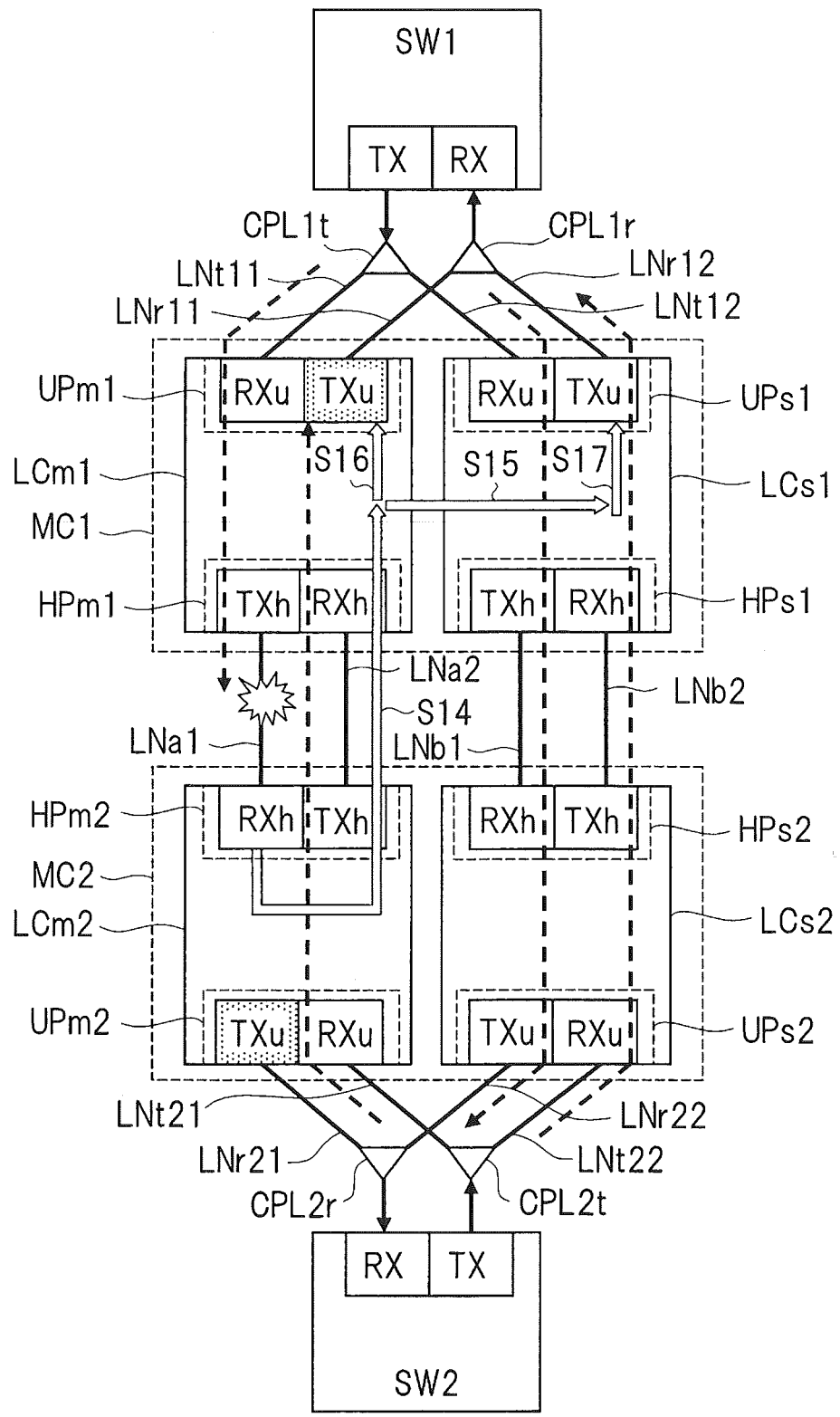
FIG. 5 is an explanatory view showing an operation example, which is performed in addition to that of FIG. 4, when the failure occurs in the communication system of FIG. 1.

FIG. 5 is an explanatory view showing an operation example, which is performed in addition to the operation of FIG. 4, when the failure occurs in the communication system of FIG. 1. By using the operation example of FIG. 4, transmission from the switch device SW1 to the switch device SW2 can be performed through the line cards LCs1 and LCs2, and transmission from the switch device SW2 to the switch device SW1 can be performed through the line cards LCm1 and LCm2. Thus, the transmission and reception path can be secured between the switch device SW1 and the switch device SW2. However, in FIG. 2, there is a case where the communication line LNa and the communication line LNb are different in length. This is because, in order to further improve the failure resistance, it is desirable to place the communication lines LNa and LNb in different environments. Then, according to only the operation example of FIG. 4, a case can occur in which latency is different between the communication path from the switch device SW1 to the switch device SW2 and the communication path in the reverse direction. Thus, there is a fear that a bad influence is exerted on, for example, the timing design of the whole system.

Then, as shown in FIG. 5, when detecting the failure of the communication line LNa1, the line card LCm2 notifies the line card LCm1 of the failure existence information based on the failure detection through the transmit port TXh in the transmission port HPm2 (step S14 (third process)). The line card LCm1 notifies the line card LCs1 of the notified failure existence information through the control signal line CS on the backplane BP1 of FIG. 2 (step S15 (fourth process)). Besides, when receiving the failure existence information at step S14, the line card LCm1 changes the transmit port TXu in the user port UPm1 from the open state to the blocking state (step S16 (fourth process)). On the other hand, when receiving the failure existence information at step S15, the line card LCs1 changes the transmit port TXu in the user port UPs1 from the blocking state to the open state (step S17 (fifth process)).

As a result, a transmission signal from the transmit port TX of the switch device SW2 is transmitted to the receive port RX of the switch device SW1 by using the path of the line card LCs2, the communication line LNb2 and the line card LCs1 instead of the path of the line card LCm2, the communication line LNa2 and the line card LCm1. That is, in addition to the communication from the switch device SW1 to the switch device SW2, communication from the switch device SW2 to the switch device SW1 in the opposite direction is also performed through the communication lines LNb1 and LNb2 (LNb of FIG. 2) on the line cards LCs1 and LCs2 side. By this, the problem of the latency can be solved and the failure resistance can be further improved. Besides, also at this time, since the chassis-type structure is used in the optical transmission devices MC1 and MC2, the notification of the failure existence information between the respective line cards at step S15 can be quickly performed. Accordingly, the change of the path at the failure occurrence can be performed at high speed.

Schematic Operation of the Communication System (when Failure is Recovered)

Figure 6:
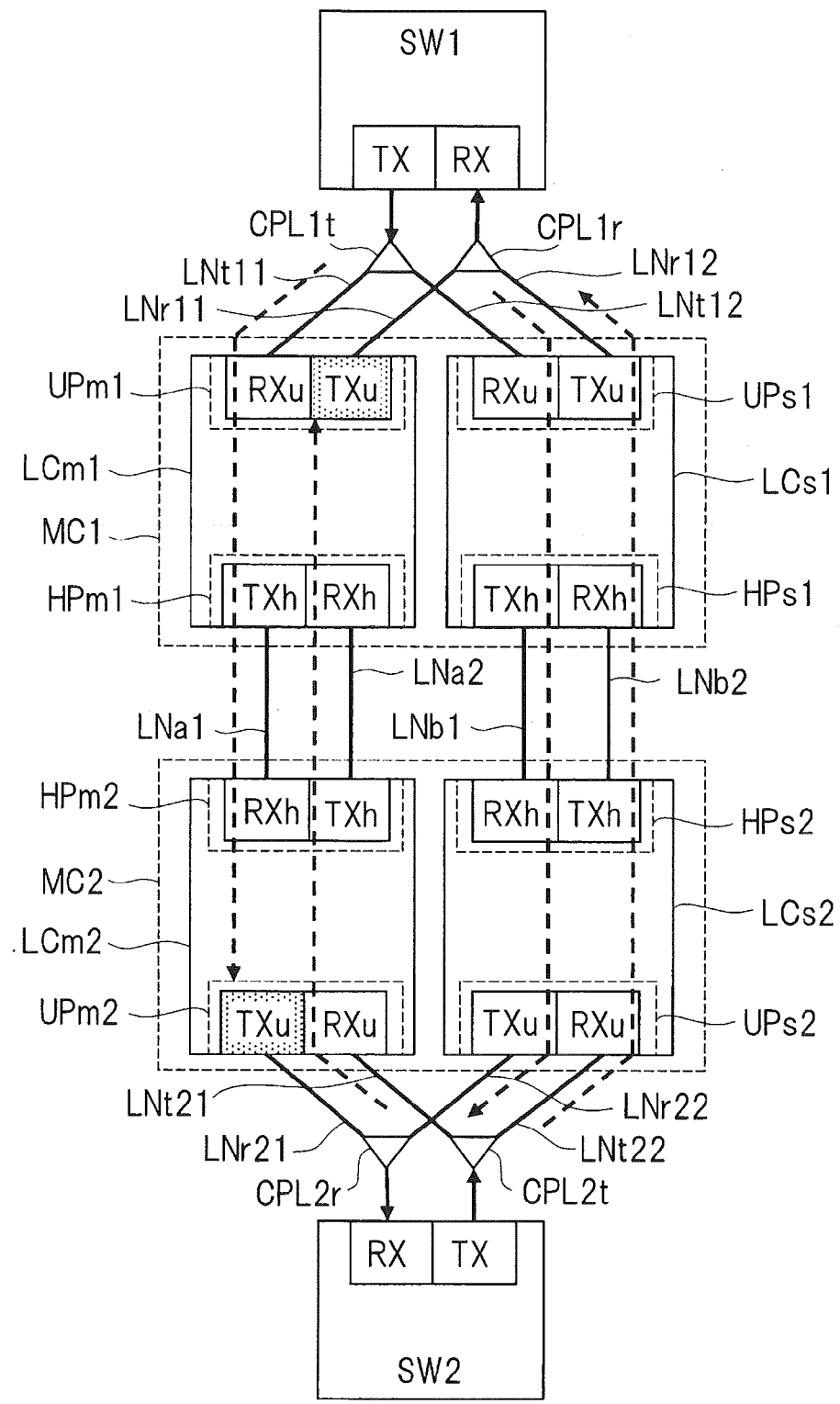
FIG. 6 is an explanatory view showing an operation example when the communication system of FIG. 1 is recovered from the failure of FIG. 4 and FIG. 5.

FIG. 6 is an explanatory view showing an operation example when the communication system of FIG. 1 is recovered from the failure of FIG. 4 and FIG. 5. In FIG. 6, the communication line LNa1 is recovered from the failure shown in FIG. 4 and FIG. 5. Here, for example, it is assumed that the line cards LCm1 and LCm2 are master cards, and the line cards LCs1 and LCs2 are standby cards (preliminary cards). When the communication line LNa1 is recovered, a change may be performed to the communication using the master card side as shown in FIG. 3. However, in this case, when the change is performed, a period can temporarily occur in which communication can not be performed between the switch device SW1 and the switch device SW2. Then, in order to prevent such a situation, in this embodiment, as shown in FIG. 6, even when the communication line LNa1 is recovered, the communication is continued using the standby card side. Thereafter, for example, when a failure occurs in the communication path on the standby card side, or when the communication system is restarted, the communication path on the master card side is again used.

Schematic Structure of Main Part of Line Card

Figure 7:
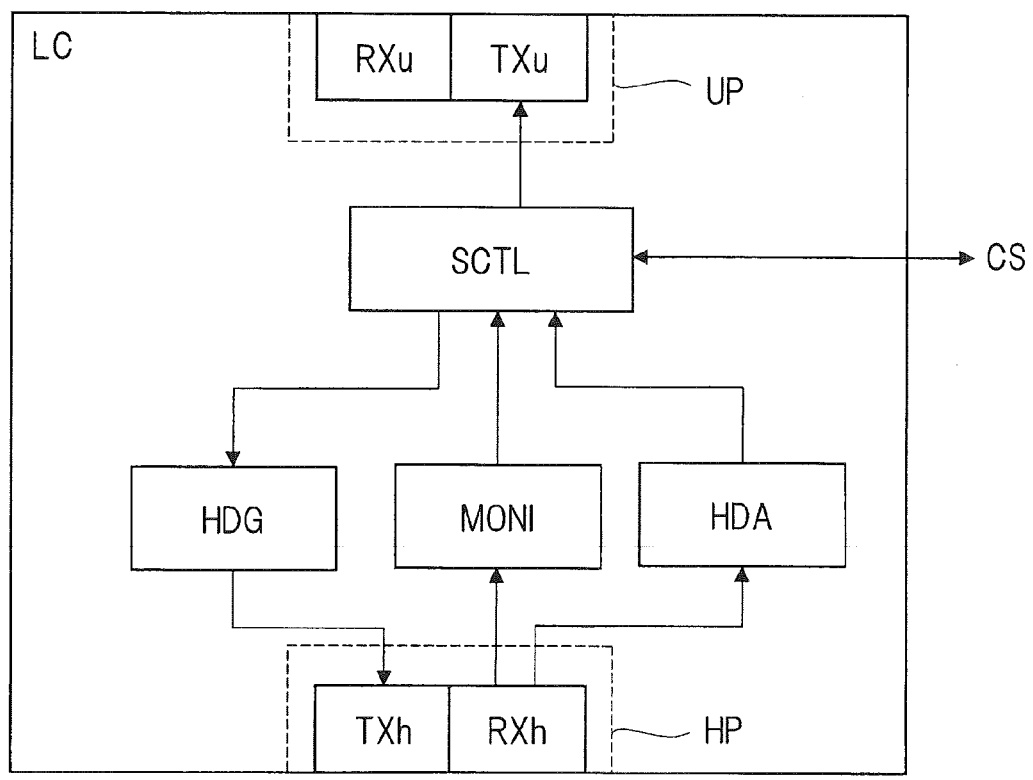
FIG. 7 is a block diagram showing a schematic structural example of a main part of each line card in the communication system of FIG. 1.

FIG. 7 is a block diagram showing a schematic structural example of a main part of each of the line cards in the communication system of FIG. 1. The line card LC shown in FIG. 7 includes a state control part SCTL, a monitor part MONT, a header analysis part HDA and a header generation part HDG in addition to general functions provided in an optical transmission device. The generation functions of the optical transmission device typically include a conversion function between an optical signal received and transmitted by the transmission port HP (or additionally the user port UP) and an electric signal used inside the line card, and a clock data recovery (CDR) function. Further, the general functions provided in the optical transmission device includes a function in which a signal from the receive port RXu in the user port UP is subjected to a specified communication protocol process, and then is transmitted from the transmit port TXh in the transmission port HP, and a signal from the receive port RXh in the transmission port HP is subjected to the specified protocol process, and then is transmitted from the transmit port TXu in the user port UP. The specified protocol process typically includes, for example, a 8B/10B or 64B/66B encoding/decoding process, and an error detection and correction process such as FEC (Forward Error Correction).

The monitor part MONI and the state control part SCTL function as a first processing part. The monitor part MONI monitors a reception signal at the receive port RXh in the transmission port HP. The monitor part uses, for example, LOS (Loss Of Signal) detection function, and when detecting such a failure that the level of received light intensity is outside a specified range (that is, when a failure occurs in the transmission path of the opposite device), the monitor part notifies the state control part SCTL of the failure existence information. Incidentally, failure detection methods include various methods such as, for example, a method of detecting an error of clock recovery in CDR function, and a method of monitoring BER (Bit Error Rate). When the failure existence information is notified from the monitor part MONI, the state control part SCTL sets the transmit port TXu in the user port UP into the blocking state as shown in FIG. 4, and further notifies another line card of the failure existence information through the control signal line CS.

Besides, the state control part SCTL functions as a second processing part. When the failure existence information is notified from another line card through the control signal line CS, the state control part SCTL sets the transmit port TXu in the user port UP into the open state as shown in FIG. 4.

Besides, the monitor part MONI, the header generation part HDG and the state control part SCTL function as a third processing part. As stated above, when the failure existence information is notified from the monitor part MONI, the state control part SCTL notifies the header generation part HDG of the information. The header generation part HDG adds the failure existence information to the header of a transmission frame (for example, an OTN (Optical Transport Network) frame, etc.), and transmits the frame through the transmit port TXh in the transmission port HP as shown in FIG. 5.

Further, the header analysis part HDA and the state control part SCTL function as a fourth processing part. The header analysis part HDA analyzes the header in the frame received at the receive port RXh in the transmission port HP, and when the failure existence information is included in the header (that is, when there is a failure in the transmission path of its own device), the header analysis part notifies the state control part SCTL of the failure existence information. When the failure existence information is notified from the header analysis part HDA, as shown in FIG. 5, the state control part SCTL sets the transmit port TXu in the user port UP into the blocking state, and notifies another line card of the failure through the control signal line CS.

Detailed Operation of the Communication System

Figure 8:
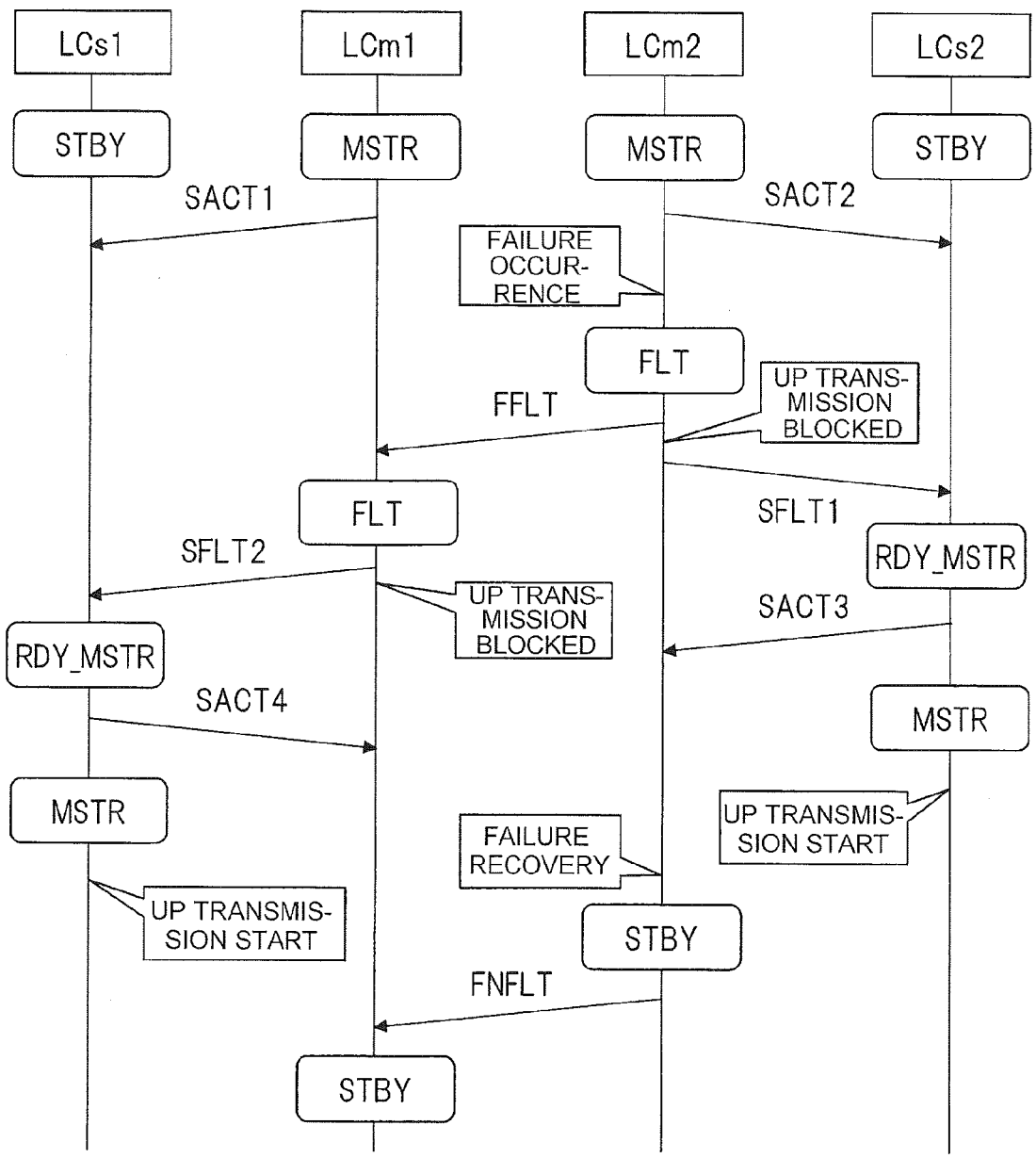
FIG. 8 is a sequence view showing an example of a detailed processing procedure of FIG. 3 to FIG. 6 in the communication system of FIG. 1.

FIG. 8 is a sequence view showing an example of a detailed processing procedure in FIG. 3 to FIG. 6 in the communication system of FIG. 1. As shown in FIG. 8, in this example, each of the line cards LCm1, LCm2, LCs1 and LCs2 has four inner states (master state MSTR, standby state STBY, master ready state RDY_MSTR, fault state FLT) in addition to a not-shown initial state. The respective inner states are changed over by, for example, the state control part SCTL of FIG. 7.

The master state MSTR is a state in which there is no failure in its own transmission and reception operations, and the transmit port TXu in the user port UP of FIG. 4 or the like is set in the open state. The standby state STBY is a waiting state as a backup against failure occurrence, and is a state in which, although there is no failure in its own transmission and reception operations, the transmit port TXu in the user port UP of FIG. 4 or the like is set in the blocking state. The master ready state RDY_MSTR is a state of a ready process in which the standby state STBY transitions to the master state MSTR, and is a state provided to remove a period in which both of two line cards (for example, the line cards LCm1 and LCs1) in the same housing are in the master state MSTR. The fault state FLT is a state in which a failure occurs in at least one of its own transmission and reception operations, and is a state in which the transmit port TXu in the user port UP is set in the blocking state.

In FIG. 8, first, in the initial state (start state), the line cards LCm1 and LCm2 are set into the master state MSTR, and the line cards LCs1 and LCs2 is set into the standby state STBY. The line card LCm1 in the master state MSTR periodically transmits an active signal SACT1 to the line card LCs1 through the backplane (BP1 in FIG. 2), and notifies the line card LCs1 that the line card LCm1 itself operates in the master state MSTR. Similarly, the line card LCm2 in the master state MSTR periodically transmits an active signal SACT2 to the line card LCs2 through the backplane (BP2 in FIG. 2), and notifies the line card LCs2 that the line card LCm2 itself operates in the master state MSTR.

Here, as shown in FIG. 4, when the line card LCm2 detects a failure, as shown in FIG. 8, the line card LCm2 transitions to the fault state FLT. By this, as shown in FIG. 4, the transmit port TXu in the user port UPm2 of the line card LCm2 is set into the blocking state. Besides, after the transition to the fault state FLT, the line card LCm2 transmits a frame (for example, an OTN frame) FFLT including failure existence information (information indicating that there is a failure in the communication path from the line card LCm1 to the line card LCm2) to the opposite line card LCm1 through the communication line (LNa2 of FIG. 4 or the like). Further, the line card LCm2 transmits a fault signal (failure existence information) SFLT1 to the line card LCs2 in the same housing through the backplane (BP2 of FIG. 2).

When receiving the fault signal SFLT1, the line card LCs2 transitions to the master ready state RDY_MSTR. The line card LCs2 in the maser ready state RDY_MSTR transmits an active signal SACT3 to the line card LCm2 in the same housing, and notifies the line card LCm2 that the line card LCs2 itself operates in the master state MSTR. Then, the line card LCs2 in the maser ready state RDY_MSTR transitions to the master state MSTR by timeout unless an active signal is received from the line card LCm2 within a specified period. By this, as shown in FIG. 4, the transmit port TXu in the user port Ups2 of the line card LCs2 is set into the open state.

On the other hand, as described before, when receiving the frame FFLT including the failure existence information from the line card LCm2 in the fault state FLT, the line card LCm1 transitions to the fault state FLT as shown in FIG. 8. By this, as shown in FIG. 5, the transmit port TXu in the user port UPm1 of the line card LCm1 is set into the blocking state. The line card LCm1 placed in the fault state FLT transmits a fault signal (failure existence information) SFLT2 to the line card LCs1 in the same housing through the backplane (BP1 of FIG. 2).

When receiving the fault signal SFLT2, the line card LCs1 transitions to the master ready state RDY_MSTR. The line card LCs1 in the master ready state RDY_MSTR transmits an active signal SACT4 to the line card LCm1 in the same housing, and notifies the line card LCm1 that the line card LCs1 itself operates in the master state MSTR. Then, the line card LCs1 in the master ready state RDY_MSTR transitions to the master state MSTR by timeout unless an active signal is received from the line card LCm1 within a specified period. By this, as shown in FIG. 5, the transmit port TXu in the user port UPs1 of the line card LCs1 is set into the open state.

Incidentally, when detecting the recovery from the failure through the receive port RXh in the transmission port HPm2, the line card LCm2 in the fault state FLT transitions to the standby state STBY. The line card LCm2 placed in the standby state STBY transmits a frame (for example, an OTN frame) FNFLT including failure nonexistence information to the opposite line card LCm1 through the communication line (LNa2 of FIG. 4 or the like). When receiving the frame FNFLT, the line card LCm1 transitions from the fault state FLT to the standby state STBY.

As stated above, the failure resistance can be relatively easily improved by using the communication system of FIG. 1 and by performing the process as shown in FIG. 8. That is, the couplers CPL1*t*, CPL1*r*, CPL2*t* and CPL2*r* as shown in FIG. 1 are provided, and the chassis-type optical transmission device is made to have, for example, the functions of FIG. 7 and is made to perform, for example, the operation as shown in FIG. 8. The functions as shown in FIG. 7 can also be realized by using existing functions to some degree.

Although the invention made by the inventor is described on the basis of the embodiment, the invention is not limited to the embodiment, and can be variously modified within the scope not departing from the spirit thereof. For example, the foregoing embodiment is described in detail in order to facilitate the understanding of the invention, and the invention is not necessarily limited to the embodiment including all the described components. Besides, a part of a structure of a certain embodiment may be replaced by a structure of another embodiment, and a structure of a certain embodiment may be added with a structure of another embodiment. Besides, a part of a structure of each embodiment may be added with, deleted or replaced by another structure.

For example, in FIG. 7 and FIG. 8, although the example is described in which the failure is notified to the opposite line card by using the header of the frame, no limitation is made to this, and another method may be used. For example, a method can be used in which a unique signal is buried between frames and notification is made. That is, if various functions, so-called in-band management, are used, the notification can be realized by various methods. Besides, in FIG. 4 and the like, although it is assumed that the failure occurs in the communication line LNa1 itself, no limitation is made to the communication line itself. When a failure occurs in a long-distance communication path including the transmit port TXh and the receive port RXh as both ends thereof, another long-distance communication path can be secured in the same way.

Further, in FIG. 1 and the like, the example is described in which for example, the two-core optical fiber cable is used, and one-way communication is performed in each core between the opposite line cards (for example, the line cards LCm1 and LCm2). However, according to circumstances, for example, by using a wavelength division multiplexing (WDM) technique, the invention can be applied also to a case where two-way communication is performed using a one-core optical fiber cable. In this case, for example, although a failure does not occur in the optical fiber cable itself, when a failure occurs in one of the transmit port (actually, an output node of a transmission system circuit such as a laser diode) and the receive port (actually, an input node of a reception system circuit such as a photodiode), the same method as that of this embodiment can be applied. That is, similarly to the case of FIG. 4 and FIG. 5, the one-core optical fiber cable has only to be used for one-way communication.

What is claimed is:
1. A communication system comprising:
    a first to a fourth line card each including a user port and a transmission port;
    a first communication line that connects the transmission port of the first line card and the transmission port of the third line card and transmits a transmission signal from the first line card to the third line card; a third communication line that transmits a transmission signal in a reverse direction to that of the first communication line;
    a second communication line that connects the transmission port of the second line card and the transmission port of the fourth line card and transmits a transmission signal from the second line card to the fourth line card; a fourth communication line that transmits a transmission signal in a reverse direction to that of the second communication line;

a first and a second switch device;

a first coupler that divides a transmission signal from the first switch device into two signals, and transmits the signals to receive ports in the user ports of the first and the second line card, respectively;

a second coupler that combines transmission signals from transmit ports in the user ports of the first and the second line card and transmits to the first switch device;

a third coupler that divides a transmission signal from the second switch device into two signals, and transmits the signals to receive ports in the user ports of the third and the fourth line card, respectively;

a fourth coupler that combines transmission signals from transmit ports in the user ports of the third and the fourth line card and transmits to the second switch device;

a first backplane that is installed with the first and the second line card, and has a communication path between the first and the second line card; and a second backplane that is installed with the third and the fourth line card, and has a communication path between the third and the fourth line card, wherein in a normal operation, the first and the third line card set the transmit ports in the user ports into an open state, and the second and the fourth line card set the transmit ports in the user ports into a blocking state, and if a failure occurs in the communication path through the first communication line from the first line card, the third line card performs a first process of detecting the failure through a receive port in the transmission port, and then changing the transmit port in the user port from the open state to a blocking state, and notifying the fourth line card of failure existence information obtained from the failure detection through the second backplane, and the fourth line card performs a second process of receiving the failure existence information and changing the transmit port in the user port from the blocking state to the open state.

2. The communication system according to claim 1, wherein the third line card performs the first process and a third process of notifying the first line card of the failure existence information through a transmit port in the transmission port and the third communication line, the first line card performs a fourth process of changing the transmit port in the user port from the open state to the blocking state in response to the failure existence information and notifying the second line card of the failure existence information through the first backplane, and the second line card performs a fifth process of changing the transmit port in the user port from the blocking state to the open state in response to the failure existence information.

3. The communication system according to claim 2, wherein after the first to the fifth process are performed, if the failure of the communication path through the first communication line from the first line card is recovered, the third line card detects the recovery through the receive port in the transmission port, and then notifies the first line card of failure nonexistence information obtained by the recovery detection through the transmit port in the transmission port and the third communication line, and the first to the fourth line card keep the states of the transmit ports in the user ports, which are set in the first to the fifth process.

4. An optical transmission device comprising:

a first and a second line card each including a user port and a transmission port; and a backplane on which the first and the second line card are installed and which has a communication path between the first and the second line card, wherein each of transmit ports in the user ports of the first and the second line card transmits to an input of a coupler for combining two inputs, each of receive ports in the user ports of the first and the second line cards receives an output from a coupler for dividing one input into two outputs, in a normal operation, one of the first and the second line card sets the transmit port in the user port into an open state, and the other sets the transmit port in the user port into a blocking state, each of the first and the second line card includes a first processing part that sets the transmit port in its own user port into the blocking state when a failure is detected at the receive port in its own transmission port, and notifies the other line card of failure existence information obtained by the failure detection through the backplane, and a second processing part that sets the transmit port in its own user port into the open state when failure existence information is received from the other line card.

5. The optical transmission device according to claim 4, wherein each of the first and the second line card further includes a third processing part that transmits, when the failure is detected at the receive port in its own transmission port, the failure existence information obtained by the failure detection through the transmit port in the transmission port, and a fourth processing part that sets the transmit port in its own user port into the blocking state when the failure existence information is received at the receive port in its own transmission port, and notifies the other line card of the failure existence information through the backplane.

* * * * *